E. J. OETTER.
RESILIENT TIRE FASTENING.
APPLICATION FILED MAY 26, 1916.
1,250,633. Patented Dec. 18, 1917.
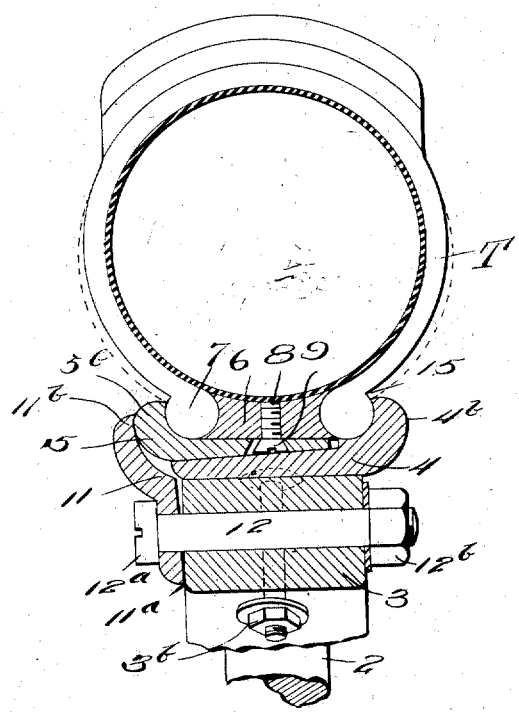
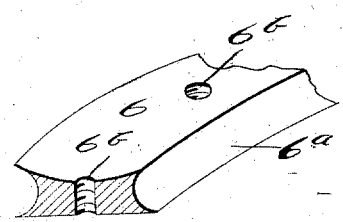
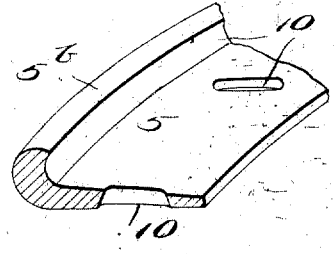
Inventor
Ernest J. Oetter,
By Mason Fenwick Lawrence,
Attorneys

UNITED STATES PATENT OFFICE.

ERNEST J. OETTER, OF DENVER, COLORADO.

RESILIENT-TIRE FASTENING.

1,250,633.     Specification of Letters Patent.     Patented Dec. 18, 1917.

Application filed May 26, 1916. Serial No. 100,095.

*To all whom it may concern:*

Be it known that I, ERNEST J. OETTER, a citizen of the United States, residing at Denver, in the county of Denver and State of Colorado, have invented certain new and useful Improvements in Resilient-Tire Fastenings; and I do hereby declare the following to be a full, clear, and exact description of the invention, such as will enable others skilled in the art to which it appertains to make and use the same.

This invention relates to resilient tires and wheels, and more especially to a fastening device for holding the tire to the felly; and the invention consists in a rim made in two members adjustable on each other so as to embrace the beads of the tire, with the aid of an interposed spacer, and means for detachably locking this rim on the felly. The device is particularly designed for use in connection with a tire more fully described and claimed in my companion application No. 84,871, filed March 17, 1916. Details of the preferred construction are set forth in the following specification and shown in the accompanying drawings wherein:—

Figure 1 is a cross section through the tire, rim, and felly; Fig. 2 is a sectional detail of a part of the outer member; and Fig. 3 is a sectional detail of a part of the spacer.

This rim may be attached to many ordinary types of wheel, whereof the drawing shows only a spoke 2 and the felly 3. The rim itself is made in two members or parts 4 and 5, surrounded by a ring or band 6 which constitutes the spacer and which has its side edges dished as shown at 6ª. The members 4 and 5 are designed to overlap each other, and their overlapping portions are wedge-shaped or taper slightly as best seen in Fig. 1. A set-off is preferably provided in the member 4 wherein the other member 5 slidingly fits. The outer edges of the members are upturned to form hook-shaped annular flanges 4ᵇ and 5ᵇ for engaging the beads 7 of the tire, which latter is herein designated as a whole by the letter T. Obviously it may be of spring metal or of other material, and it is quite possible that it could be the casing of an ordinary pneumatic tire. I consider it important to the present invention, however, that the beads should be of circular cross section as shown; and the dished inner faces of the flanges 4ᵇ and 5ᵇ coacting with the dished edges 6ª of the spacer produce nearly circular openings for receiving said beads. Where the side portion 14 of the tire unites with the bead as indicated at 15, there is a certain space between the adjacent corners of the flange and spacer, which space is greater than the thickness of said side, thus allowing the bead to revolve slightly when the tire is put under pressure and its sides distended as shown by the dotted lines.

The means for fastening this rim on the wheel are not important. In Fig. 1 I have shown the inner or base member 4 as secured to the felly 3 by bolts 3ᵇ passing through them at intervals. To remove this member the bolts will have to be taken out. The outer member 5 lies upon the outer or beveled face of the inner member within its set-off, and is held adjustably thereon by any suitable means which may constitute part of the rim-fastening means. As shown herein bolts 12 are passed through the felly at intervals and held by nuts 12ᵇ, while clamp plates 11 engaged beneath the heads 12ª of the bolts are adapted to fulcrum against the side of the felly and drawn inward by setting up the nuts. The outer end of each plate bears against the outer edge of the member 5 as shown. Said member is provided at intervals with transverse slots 10 through which from the inside are passed screws or equivalent fastening devices 8 which engage holes 6ᵇ in the spacer, the heads 9 of these screws being slidably mounted in the slots 10.

With this construction it will be evident that by adjusting the members 4 and 5 toward each other—through the setting up of the nut 12ᵇ or by any other means—their flanges will be caused to approach more closely to the spacer 6 so as to more tightly embrace the beads 7 of the tire. Meanwhile the spacer will automatically adjust itself to a central position between said flanges by reason of the loose engagement of the screw 8 with the slot 10, and thus the pressure is equalized on both beads. Any increase of this pressure will of course tend to impede the revolving of the bead in its respective space or channel, and this will in turn result in stiffening the spring action in the sides 14 of the tire T. Therefore the adjustment of the clamp 11 serves this function as well as its above mentioned purpose of retaining the rim-members in place. The clamp 11 is, in fact, used as a lever, having one end fulcrumed against the side of the felly at 11ª and its other end 11ᵇ bearing against the flange of the member 5, the power being applied intermediately by the bolt 12 or other fastening device. When this bolt is set up and the clamping plate adjusts the outer member 5 inward over the inner member 4 in the set-off of the latter, not only are the channels for the beads reduced slightly in size as the spacer centers itself automatically, but the bodies of the two members by reason of their wedge shape coact to produce a greater aggregate thickness inside the spacer 6 and tire T, which tightens all parts in their engagement with each other in their final position.

Therefore this improved tire fastening device may be said to include means for holding the beads of the tire in the two-part rim more or less tightly or for releasing them so that the tire can be taken off the wheel, as well as means for holding said parts on the felly adjustably with relation to each other or removably so that the outer member can be taken off the wheel when desired. I do not wish to be limited to the construction of the tire further than that each bead should have the cross sectional outline of a nearly complete circle.

What I claim is:

1. A fastening for a resilient tire whose beads have each the outline of a nearly complete circle, the same comprising two members slidably mounted on each other and having flanges along their edges dished on their inner faces, a spacer carried by the outer member with its edges dished opposite said dished faces to provide channels conforming with the shape of the respective beads, means for securing the spacer loosely to said member to permit its automatic transverse movement thereon to a position midway between said flanges, and means for adjusting the members on each other and for fastening them to the wheel.

2. A fastening for a resilient tire whose beads have each the outline of a nearly complete circle, the same comprising two members slidably mounted on each other and having flanges along their edges dished on their inner faces, a spacer carried by the outer member with its edges dished opposite said dished faces to provide channels conforming with the shape of the respective beads, the outer member having transverse slots in its body at intervals, fastening devices in said spacer with their heads movably mounted in said slots, and means for adjusting the members on each other and for fastening them to the wheel.

In testimony whereof I affix my signature in presence of two witnesses.

ERNEST J. OETTER.

Witnesses:
 CARLE WHITEHEAD,
 ALBERT L. VOGL.